Patented Jan. 8, 1935

1,987,114

UNITED STATES PATENT OFFICE 1,987,114

ARTIFICIAL MASS

Leo Kollek, Ludwigshafen-on-the-Rhine, Germany, assignor to I. G. Farbenindustrie Aktiengesellschaft, Frankfort-on-the-Main, Germany No Drawing. Application December 4, 1930, Serial No. 499,969. In Germany December 19, 1929

15 Claims. (Cl. 106—37)

The present invention relates to the production of artificial masses.

I have found that valuable homogeneous artificial masses and solutions thereof can be obtained by incorporating cellulose derivatives capable of forming hard films, or solutions of these derivatives in organic solvents, with one or more from viscous to solid polymerization products of alkylene oxides, such as ethylene or propylene oxides. For the sake of brevity the aforesaid polymerization products of alkylene oxides will be referred to in the following and in the claims as "viscosolid" polymerization products, which term is meant to comprise the polymerization products of alkylene oxides which are viscous at room temperature as well as those which are more or less solid at the said temperature and become viscous liquids on heating, in contradistinction to dioxane which is a thin liquid at room temperature and readily crystallizes on cooling to about 8° C.

The said viscosolid polymerization products of alkylene oxides can be obtained for example by means of caustic alkalies, alkali metals, metal or metalloid halides such as tin tetrachloride or organic bases such as trimethyl amine and/or by the action of heat or by other similar methods of polymerization, and are viscous liquids or solid in contrast to dioxane and its homologues. Thus the polymerization products of ethylene oxide of a low degree of polymerization are viscous liquids, while those of a higher degree are solid. The solid polymerization products of alkylene oxides partly exhibit a touch and appearance similar to those of from soft to hard paraffin wax. The polymerization products of ethylene oxide are more or less readily soluble in water and in many organic solvents as for example in methyl alcohol, ethyl alcohol, acetone, ethyl acetate, methylene chloride, chloroform, butyl acetate, cyclohexanone, benzyl alcohol and the like, whereas the polymerization products of propylene and higher oxides are soluble only in organic solvents or concentrated aqueous solutions thereof. On account of their good solvent power for many organic substances as for example for natural resins such as colophony, manilla copal, kauri copal, mastic, or artificial resins and the like, homogeneous solutions of the aforesaid agents, if desired together with oils and/or dyestuffs, can be obtained which are suitable for the production of the artificial masses and of their solutions, which latter are valuable coating compositions or intermediates in the production of solid articles. Together with cellulose derivatives, as for example with nitrocelluloses having different nitrogen content, water-insoluble cellulose ethers for example ethyl benzyl cellulose, cellulose acetate-butyrate and like mixed esters of cellulose when dissolved in organic solvents they yield homogeneous solutions from which completely clear films, threads, lacquer coatings and the like having very good and lasting elasticity and flexibility can be prepared. In spite of the relatively high melting points of products of a high degree of polymerization, crystallization phenomena do not take place in the films.

Moreover, contrasted with the artificial masses prepared with the softening agents hitherto usual, such as camphor, tricresyl phosphate or esters of phthalic, tartaric, adipic acids and the like or castor oil, the artificial masses prepared from cellulose derivatives while employing polymerization products of alkylene oxides have the advantage of a very good stability to light. Thus for example nitrocellulose films prepared with the addition of alkylene oxide polymerization products do not become yellow or only become yellow to a very slight extent even after exposure to light for very long periods of time. In spite of the good solubility in water of many of the said polymerization products, artificial masses having good stability to water may be prepared therewith. If desired the polymerization products of alkylene oxides may also be employed in admixture with other softening agents such as those referred to above. The quantities of the polymerization products employed may be a few per cent up to equal quantities of the film-forming substances depending on the purpose for which the preparations are intended. Thus for example solid artificial masses may contain for example from 10 to 100 per cent or more, of the film-forming substance of polymerization products and no solvents though solvents may be employed in their production. On the other hand coating compositions may contain from 1 to 50 per cent of the film forming substance of polymerization products and from about double to three times the quantity or more of solvent with reference to the film-forming substance.

The following examples will further illustrate the nature of this invention, but the invention is not restricted to these examples. The parts are by weight.

Example 1

5 parts of a collodion cotton the solutions of which show a high viscosity are dissolved together with an addition of 1.5 parts of a polymerization product of ethylene oxide having a melting point of about 52° C. in a mixture of 40 parts of butyl acetate, 13.5 parts of butanol, 20 parts of benzene and 20 parts of ethyl alcohol. The solution prepared in this manner yields clear, elastic and light proof coatings on a great variety of substrata, as for example metal.

Example 2

10 parts of a collodion cotton the solutions of which show a low viscosity are dissolved together with 2 parts of colophony and 1.75 parts of the ethylene oxide polymerization product specified in Example 1 in a mixture of 30 parts of butyl acetate, 10 parts of cyclohexanone, 10 parts of butanol, 20 parts of ethyl alcohol and 20 parts of benzene. The polymerization product of ethylene oxide may be replaced by a similar product from propylene oxide.

The lacquers thus obtained yield clear lustrous coatings on wood.

Example 3

By dissolving 5 parts of benzyl cellulose with the addition of 1.75 parts of the ethylene oxide polymerization product specified in Example 1 in a mixture of 40 parts of benzene, 40 parts of toluene, 9 parts of butyl acetate and 6.25 parts of ethyl alcohol, a lacquer is obtained which may be employed for preparing coatings on any substratum, as for example on wood.

Example 4

7 parts of a collodion cotton the solutions of which show a low viscosity are dissolved together with 1.75 parts of an ethylene oxide polymerization product having a melting point of 57° C., in a mixture of 40 parts of butyl acetate, 20 parts of butanol, 20 parts of ethyl alcohol and 20 parts of benzene. The resulting solution is used for pouring films, and films of very good mechanical properties and excellent stability to light are obtained.

Example 5

A solution of 10 parts of camphor and 5 parts of the ethylene oxide polymerization product specified in Example 4 in 55 parts of ethyl alcohol is added to 70 parts of a nitrocellulose suitable for the preparation of celluloid and the whole is worked up on a roller or extrusion press. A plastic product is obtained from which any kind of shaped article having very good elasticity may be prepared by moderate heating, if desired under mechanical pressure.

Example 6

10 parts of a collodion cotton the solutions of which show a low viscosity are dissolved in a mixture of 20 parts of acetone, 25 parts of butyl acetate, 10 parts of butanol, 43 parts of benzene and 16 parts of toluene. 4 parts of dewaxed dammar resin and 10 parts of a dyestuff paste which has been obtained by intimately triturating 3 parts of Lithol Fast Scarlet RN (see Schultz, Farbstofftabellen, 1923, volume 1, No. 73) with a solution of 4 parts of the ethylene oxide polymerization product specified in Example 1 in 3 parts of toluene, are then added to this solution. A covering lacquer is obtained which yields elastic coatings for example on substrata of wood or metal or artificial material.

Example 7

A priming composition which when applied in the usual manner onto metallic or other substrata yields coatings having valuable properties is obtained when a solution of 10 parts of a collodion cotton the solutions of which show a low viscosity in a mixture of 5 parts of acetone, 10 parts of butyl acetate and 5 parts of butanol to which has been added 5 parts of the ethylene oxide polymerization product specified in Example 4 and a solution of 5 parts of dewaxed dammar resin in 20 parts of toluene is intimately mixed with 40 parts of slate meal, 20 parts of lithopone, 20 parts of chalk and 10 parts of talc.

Coatings of cellulose lacquer may be applied in any usual and convenient manner onto substrata covered with this priming composition.

What I claim is:—

1. As new articles of manufacture homogeneous artificial compositions comprising a water-insoluble derivative of cellulose and a viscosolid polymerization product of an alkylene oxide containing from two to three carbon atoms.

2. As new articles of manufacture homogeneous artificial compositions comprising a water-insoluble derivative of cellulose, a viscosolid polymerization product of an alkylene oxide, and an organic solvent capable of dissolving the said materials.

3. As new articles of manufacture homogeneous artificial compositions comprising a cellulose ester, a viscosolid polymerization product of an alkylene oxide, containing from 2 to 3 carbon atoms, and an organic solvent capable of dissolving the said materials.

4. An artificial mass comprising a water-insoluble derivative of cellulose and a viscosolid polymerization product of an alkylene oxide.

5. A homogeneous composition comprising a water-insoluble derivative of cellulose and a viscosolid polymerization product of ethylene oxide.

6. A homogeneous composition comprising a water-insoluble derivative of cellulose, a viscosolid polymerization product of ethylene oxide and an organic solvent capable of dissolving said substances.

7. A homogeneous composition comprising a water-insoluble derivative of cellulose and a viscosolid polymerization product of propylene oxide.

8. A homogeneous composition comprising a nitrocellulose and a viscosolid polymerization product of an alkylene oxide.

9. A homogeneous composition comprising a nitrocellulose and a viscosolid polymerization product of ethylene oxide.

10. A homogeneous composition comprising a nitrocellulose and a viscosolid polymerization product of propylene oxide.

11. A homogeneous composition comprising a collodion cotton and a viscosolid polymerization product of ethylene oxide.

12. A homogeneous composition comprising benzyl cellulose and a viscosolid polymerization product of an alkylene oxide.

13. A homogeneous composition comprising benzyl cellulose and a viscosolid polymerization product of ethylene oxide.

14. A homogeneous composition comprising a nitrocellulose and a viscosolid polymerization product of ethylene oxide and an organic solvent essentially comprising butyl acetate.

15. A homogeneous composition comprising benzyl cellulose and a viscosolid polymerization product of ethylene oxide and an organic solvent essentially comprising butyl acetate.

LEO KOLLEK.